(12) United States Patent
Wang et al.

(10) Patent No.: US 8,431,657 B2
(45) Date of Patent: Apr. 30, 2013

(54) CATALYST ACTIVATION IN A DUAL REACTOR PROCESS

(75) Inventors: XiaoChuan Wang, Calgary (CA); Peter Zoricak, Calgary (CA); Stephen John Brown, Calgary (CA)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 13/303,790

(22) Filed: Nov. 23, 2011

(65) Prior Publication Data

US 2012/0149856 A1 Jun. 14, 2012

(30) Foreign Application Priority Data

Dec. 10, 2010 (CA) ..................................... 2724943

(51) Int. Cl.
  *C08F 2/00* (2006.01)
  *C08F 4/00* (2006.01)
  *C08F 4/06* (2006.01)
  *C08F 4/44* (2006.01)
  *C08F 210/00* (2006.01)

(52) U.S. Cl.
  USPC .............. 526/65; 526/90; 526/348; 526/131; 526/135

(58) Field of Classification Search .................... 526/65, 526/90, 131, 135, 348
See application file for complete search history.

(56) References Cited

U.S. PATENT DOCUMENTS

| | | |
|---|---|---|
| 3,914,342 A | 10/1975 | Mitchell |
| 4,543,399 A | 9/1985 | Jenkins, III |
| 4,588,790 A | 5/1986 | Jenkins, III |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,028,670 A | 7/1991 | Chinh et al. |
| 5,057,475 A | 10/1991 | Canich |
| 5,064,802 A | 11/1991 | Stevens et al. |
| 5,096,867 A | 3/1992 | Canich |
| 5,132,380 A | 7/1992 | Stevens et al. |
| 5,189,106 A | 2/1993 | Morimoto et al. |
| 5,198,401 A | 3/1993 | Turner et al. |
| 5,324,800 A | 6/1994 | Welborn, Jr. |
| 5,326,835 A | 7/1994 | Ahvenainen et al. |
| 5,352,749 A | 10/1994 | DeChellis et al. |
| 5,405,922 A | 4/1995 | DeChellis et al. |

(Continued)

FOREIGN PATENT DOCUMENTS

| | | |
|---|---|---|
| CA | 2229608 C | 6/2005 |
| CA | 2337380 C | 11/2010 |

OTHER PUBLICATIONS

ASTM Desgination D6474-99 (reapprovred 2006), Standard test meth. for determ. mol. wt. distrib. and mol. wt. aver. of polyolefins by high temp. gel permeation chromatography, (2011).

(Continued)

*Primary Examiner* — William Cheung
(74) *Attorney, Agent, or Firm* — Kenneth H. Johnson (57) ABSTRACT

Catalysts are activated in a dual reactor solution process by adding substoichiometric and superstoichiometric amounts of an ionic activator to an organometallic polymerization catalyst in a first and second reactor respectively. The new activation method allows one to alter process conditions in a favorably way with minimum impact to process economics. The new activation method also provides polymers which give films having improved optical properties.

20 Claims, 1 Drawing Sheet

U.S. PATENT DOCUMENTS

| | | |
|---|---|---|
| 5,434,116 A | 7/1995 | Sone et al. |
| 5,554,775 A | 9/1996 | Krishnamurti et al. |
| 5,589,555 A | 12/1996 | Zboril et al. |
| 5,605,969 A | 2/1997 | Tsutsui et al. |
| 5,633,394 A | 5/1997 | Welborn, Jr. |
| 5,637,659 A | 6/1997 | Krishnamurti et al. |
| 5,703,187 A | 12/1997 | Timmers |
| 5,844,045 A | 12/1998 | Kolthammer et al. |
| 5,869,575 A | 2/1999 | Kolthammer et al. |
| 6,002,033 A | 12/1999 | Razavi et al. |
| 6,034,021 A | 3/2000 | Wilson et al. |
| 6,063,879 A | 5/2000 | Stephan et al. |
| 6,194,520 B1 | 2/2001 | Cheruvu et al. |
| 6,225,421 B1 | 5/2001 | Promel et al. |
| 6,235,672 B1 | 5/2001 | McKay et al. |
| 6,245,865 B1 * | 6/2001 | Lee et al. .................. 526/65 |
| 6,277,931 B1 | 8/2001 | Jaber et al. |
| 6,319,998 B1 | 11/2001 | Cozewith et al. |
| 6,342,463 B1 | 1/2002 | Stephan et al. |
| 6,372,864 B1 | 4/2002 | Brown |
| 6,469,103 B1 | 10/2002 | Jain et al. |
| 6,489,413 B1 | 12/2002 | Floyd et al. |
| 6,545,088 B1 | 4/2003 | Kolthammer et al. |
| 6,777,508 B1 | 8/2004 | Parodi et al. |
| 6,777,509 B2 | 8/2004 | Brown et al. |
| 6,946,521 B2 | 9/2005 | Miserque et al. |
| 6,984,695 B2 | 1/2006 | Brown et al. |
| 6,995,216 B2 | 2/2006 | Winslow et al. |

OTHER PUBLICATIONS

ASTM Desgination D792-08, Standard test methods for density and specific gravety (relative density) of plastics by displacement, (2011).

ASTM Desgination D1238-10, Standard test method for melt flow rates of thermoplastics by extrusion plastometer, (2011).

ASTM Desgination D1003-11, Standard test method for haze and luminous transmittance of transparent plastics, (2011).

ASTM Desgination D2457-03, Standard test method for specular gloss of plastic films and solid plastics, (2011).

ASTM Desgination D1709-01, Standard test methods for impact resistance of plastic film by the free-falling dart method, (2001).

ASTM Desgination D1922-03a, Standard test method for propagation tear resistance of plastic film and thin sheeting by pendulum method, (2011).

ASTM Desgination D882-10, Standard test method for tensile properties of thin plastic sheeting, (2011).

Stephan et al, An approach to catalyst design: cyclopentadienyl-Ti phosphinimide complexes in ethylene poly., Organometallics, vol. 22, No. 9, 2003, p. 1937-47.

* cited by examiner

CATALYST ACTIVATION IN A DUAL REACTOR PROCESS

FIELD OF THE INVENTION

The present invention relates to a multi stage polymerization process in which a single site catalyst is treated with specific activator component ratios in each of a first and second polymerization stage. The invention allows for the production of high molecular weight polyethylene with improved polymerization process operability, while maintaining process economics and low product metal residues, especially for a dual reactor solution polymerization system. The invention also provides polymers which when made into film have outstanding optical properties.

BACKGROUND OF THE INVENTION

Use of multi reactor polymerization systems is common in the preparation of polyethylenes. Dual reactor systems for example, are ideal for the formation of in situ polymer blends while providing a large degree of control over the final polymer architecture. By altering the conditions and/or catalysts used in each polymerization reactor, a large range of polymer architectures can be accessed including bimodal high density compositions for pipe having a comonomer content which increases as molecular weight increases, and narrow molecular weight medium density compositions with controlled comonomer incorporation for balanced film properties.

There are several types of multi or dual reactor systems employed for olefin polymerization. These include dual slurry phase loop reactor systems, cascading slurry phase stirred tank reactor systems, in-series dual gas phase fluidized bed reactor systems, in-series solution phase stirred tank reactor systems, in-series solution phase loop reactors, and hybrid systems comprising a gas phase fluidized bed reactor downstream of a slurry phase reactor.

The use of a dual gas phase reactor system is described in U.S. Pat. No. 6,194,520. Ethylene polymer compositions suitable for blow molding applications are produced by i) feeding catalyst, cocatalyst and monomer to a first fluidized bed reactor to form a first polymer component and ii) feeding the first polymer component to a second fluidized bed reactor (which is connected in series) in which a second polymer component is formed. Additional cocatalyst and monomer are fed to the second fluidized bed reactor. The catalysts employed in this dual fluidized bed reactor system were Ziegler-Natta type catalysts.

A multi-stage slurry polymerization process is described in U.S. Pat. No. 5,189,106. In the process, a Ziegler-Natta catalyst is fed to a first stirred tank slurry phase polymerization reactor along with monomer, cocatalyst and hydrogen. A polymer product forms as a slurry in an inert diluent in the first reactor and is then passed via a feed line to a second stirred tank slurry phase polymerization reactor where it is combined with additional monomer to continue the polymerization reaction. By changing the conditions used in each reactor, a polymer composition having two distinct polymer components is formed.

A dual slurry loop process in which a Zeigler-Natta catalyst is used to polymerize ethylene in the presence and absence of comonomer over two slurry loop reactors, connected in series, is described in U.S. Pat. No. 6,225,421.

A hybrid process comprising a slurry loop reactor upstream of a fluidized bed gas phase reactor is discussed in U.S. Pat. No. 5,326,835. In the process, ethylene is first polymerized in an inert low boiling hydrocarbon medium in a slurry loop reactor. Next, the product mixture is discharged and most of the hydrocarbon medium is removed. The resulting polymer product is then transferred to a fluidized bed gas phase reactor where polymerization is completed in the presence of further ethylene and optional comonomer and hydrogen. A Ziegler-Natta catalyst is employed to provide bimodal or broad molecular weight polyethylene compositions.

A dual reactor solution process employing Ziegler-Natta catalysts is described in U.S. Pat. No. 3,914,342. The polymerization takes place in an isooctane solvent in two parallel reactors, each operating at a temperature of 150° C. After a certain catalyst residence time, the polymer solutions formed in each reactor are combined in a mixing zone. After solvent removal, a two component polymer composition is obtained.

U.S. Pat. No. 6,946,521 describes a dual slurry loop reactor process in which a bridged metallocene catalyst is used in each of two reactors which are connected in series. Compositions suitable for pipe applications are generated. The metallocene catalysts are supported on silica and methylaluminoxane is used as a cocatalyst. In this dual loop slurry process, catalyst is fed only to the first reactor.

U.S. Pat. Nos. 5,844,045 and 5,869,575 discuss a dual reactor solution polymerization process in which a constrained geometry catalyst is used in a first continuous stirred tank reactor, while a Ziegler-Natta catalyst is employed in a second stirred tank reactor and which receives an effluent stream (i.e. a polymer solution) from the first reactor. The examples model such a system using a single solution phase reactor in which a first step is conducted in the presence of a constrained geometry catalyst and a second step is carried out in the presence of a Ziegler-Natta catalyst. A narrow molecular weight polymer component having a narrow composition distribution is made in the first polymerization step (or reactor) and a broad molecular weight component having a broad composition distribution is made in the second polymerization step (or reactor). In the examples, a molar excess of an organoborane activator is used relative to a constrained geometry catalyst in the first step of the polymerization process.

A dual loop reactor system effective for solution polymerization of ethylene with 1-octene is employed in U.S. Pat. No. 6,469,103. A constrained geometry catalyst is employed in a first loop reactor to provide a lower density, higher molecular weight component. A Ziegler-Natta catalyst is employed in a second loop reactor to provide a lower molecular weight, higher density component.

A dual stirred tank reactor process for the solution polymerization and copolymerization of ethylene using two different catalysts is described in U.S. Pat. No. 6,277,931. A phosphinimine type single site catalyst is used in a first reactor and a Ziegler-Natta catalyst is used in a second reactor. The process allows for architectural control over polyethylene products having a relatively broad molecular weight distribution. In the process, a molar excess of a trityl borate type activator is added relative to a phosphinimine catalyst in a first polymerization reactor. An alkylaluminoxane is also added as a cocatalyst component.

A two step polymerization sequence, in which a metallocene catalyst is employed as the catalyst in both steps is disclosed in U.S. Pat. No. 5,605,969. The activator employed is an alkylaluminoxane compound. There is no mention of the use of organoborane or ionic activator compounds. The polymerization process is exemplified using a single reactor which is operated under a first and then a second set of polymerization conditions. The metallocene catalyst and alkylaluminoxane activator are added only during the first polymerization step.

A two stage polymerization sequence is described in U.S. Pat. No. 6,995,216. Both multi-step single reactor polymerizations and multi-reactor processes were contemplated. Different polyolefin products are made in different stages or reactors by varying monomer composition, hydrogen concentration or both. The process, which employs a supported and bridged indenoindolyl metallocene catalyst, provides polyolefins which have a broad molecular weight distribution, a broad composition distribution, or both. The patent contemplates the addition of a supported pre-activated catalyst only to a first polymerization reactor when such a reactor is connected in series with a second polymerization reactor (or the addition of a supported pre-activated catalyst only during a first polymerization stage, when two polymerization stages are carried out in a single reactor).

U.S. Pat. No. 6,319,998 teaches the use of two continuous flow, stirred tank, in-series reactors for the polymerization of ethylene with propylene. The ethylene-propylene (EP) elastomeric product is formed in a solution phase in the presence of an activated single site catalyst. By using a two reactor system, a blend is formed in which blend components can differ in their composition, their molecular weight and in their crystallinity. Ethylene-propylene-diene monomer (EPDM) terpolymers may also be formed using the dual reactor process. In the preferred method, solvent and monomers are fed to each reactor, and a single site catalyst is added only to the first reactor. An effluent stream from the first reactor is passed to the second reactor for continued polymerization. The activator used was N,N-dimethylanilinium tetrakis(pentafluorophenyl)borate (DMPFB). Exemplified catalysts included metallocene catalysts and constrained geometry catalysts. The molar ratio of ionic activator (DMPFB) to metallocene catalyst or constrained geometry catalyst was in all cases 1:1, and the catalyst and activator components were fed only to the first polymerization reactor.

The production of EP or EPDM elastomers using a dual reactor solution polymerization process is also described in U.S. Pat. No. 6,545,088. Two continuously stirred tanks reactors are operated in series and polymerization is carried out in the presence of a constrained geometry catalyst, a trispentafluorophenylborane activator, and a methylaluminoxane scavenger. The catalyst, activator and scavenger are fed to each reactor. The molar ratio of the borane activator to the constrained geometry catalyst fed to the first reactor was from 3.4:1 to 5.0:1 (i.e. a molar excess of the borane activator was used in the first reactor). The molar ratio of the borane activator to the constrained geometry catalyst fed to the second reactor was from 3.0:1 to 3.5:1 (i.e. a similar molar excess of the borane activator was used in the second reactor). The patent teaches that first and second reactors may be operated at temperatures of from 65° C. to 90° C. and from 85° C. to 120° C., respectively.

U.S. Pat. No. 6,372,864 describes a dual reactor solution process employing a phosphinimine type single site catalyst in each reactor. In order to activate the catalyst, a different cocatalyst composition is employed in each reactor. In the first reactor, the cocatalyst used contained at least an alkylaluminoxane activator (which is added in a large molar excess relative to the phosphinimine catalyst). In the second reactor the cocatalyst contained at least a trityl borate species (e.g. triphenylmethylium tetrakispentafluorophenylborate, $Ph_3CB(C_6F_5)_4$. Mixtures containing both alkylaluminoxane and trityl borate activators were also contemplated, provided that the ratio of activator components used was different in each of the two reactors. The patent expressly discloses (see Table 1 of U.S. Pat. No. 6,372,864) a dual reactor process in which an excess of methylaluminoxane and a substoichiometric amount of trityl borate is used relative to a phosphinimine catalyst in a first reactor of a dual reactor process. Although favoring methylaluminoxane in a first reactor allowed access to higher molecular weight polymer, the use of substoichiometric amounts of ionic activator also reduced the catalyst activity. This in turn required higher catalyst feed rates to the first reactor (see Table 1 of U.S. Pat. No. 6,372,864) in order to maintain ethylene conversion and polymer split targets over the first and second reactors (i.e. the weight ratio of polymer made in each of the first and second reactors). The high catalyst feed rate required for the poorly active catalyst increased catalyst cost per pound of polyethylene produced and increased the metal residues in the final product. This is not ideal for optimizing process economics and product properties. Thus, an improvement which enhances process operability for the production of high molecular weight polyethylene, without substantially impacting process economics and/or polymer metal residues is needed. Accordingly, we have now discovered that by adding a sufficiently large stoichiometric excess of ionic activator to the second reactor, much of the catalyst activity loss in the first reactor can be reversed in the second reactor and without sacrificing high molecular weight performance. Hence, problems associated with higher product metal residues or accessing improved process operability and high molecular weight polymer in an economical way, are minimized or eliminated. Interestingly, we have also found that polymer made in this way has outstanding optical properties when made into film. Although, use of a small stoichiometric excess of ionic activator, is in fact disclosed in U.S. Pat. No. 6,372,864 (the molar feed ratio to the second reactor of ionic activator to catalyst is 1.2 or 1.3 as shown in Table 1), the disclosed ratios are insufficient to solve the problems highlighted above.

SUMMARY OF THE INVENTION

The current invention allows for the formation of high molecular weight polymer, at high temperature and with improved polymerization process operability, while not significantly impacting process economics or increasing metal residues in the final product.

High molecular weight polymer compositions can be accessed in a dual reactor solution polymerization process without forfeiting polymer production economics and without increasing polymer metal residues significantly, by using a sub-stoichiometric amount of an ionic activator and an excess of alkylaluminoxane (relative to the polymerization catalyst) in a first reactor and a "large" stoichiometric excess (i.e. "superstoichiometric" amount) of an ionic activator (relative to the polymerization catalyst) in a second reactor.

The current invention provides for the formation of polymers having improved optical properties when made into film as determined by haze and gloss measurements.

Films having improved optical properties can be accessed from polymers made in a dual reactor solution polymerization process without forfeiting polymer production economics and without increasing polymer metal residues significantly, by using a sub-stoichiometric amount of an ionic activator and an excess of alkylaluminoxane (relative to the polymerization catalyst) in a first reactor and a "large" stoichiometric excess (i.e. "superstoichiometric" amount) of an ionic activator (relative to the polymerization catalyst) in a second reactor.

Provided is a two stage polymerization process comprising: in a first stage, polymerizing ethylene and optionally an alpha olefin in the presence of an organometallic catalyst and a cocatalyst, the cocatalyst comprising an alkylaluminoxane and an ionic activator, wherein the molar ratio of ionic activator to organometallic catalyst fed to a reactor is less than 1.0; and in a second stage polymerizing ethylene optionally with an alpha olefin in the presence of an organometallic catalyst and a cocatalyst, the cocatalyst comprising an alkylaluminoxane and an ionic activator, wherein the molar ratio of ionic activator to organometallic catalyst freshly fed to a reactor in the second stage is at least 1.5; further provided that the total molar ratio of ionic activator to organometallic catalyst present over both reactors is at least 0.8.

In an embodiment of the invention, the first and second stage of the polymerization process is carried out in a single polymerization reactor.

In an embodiment of the invention, the first and second stage of the polymerization process is carried out in a first reactor and a second reactor connected in series, respectively.

In an embodiment of the invention, the polymerization process is a slurry phase process.

In an embodiment of the invention, the polymerization process is a solution phase process.

Provided is a two stage polymerization process comprising: in a first reactor, polymerizing ethylene and optionally an alpha olefin in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; feeding an effluent stream from the first reactor to a second reactor and in the second reactor polymerizing ethylene optionally with an alpha olefin in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including catalyst and ionic activator present in the effluent stream from the first reactor; further provided that the total molar ratio of ionic activator to organometallic catalyst present over both reactors is at least 0.8.

Provided is film which has good optical properties, the film comprising a polymer made in a two stage polymerization process comprising: in a first reactor, polymerizing ethylene and optionally an alpha olefin in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; feeding an effluent stream from the first reactor to a second reactor and in the second reactor polymerizing ethylene optionally with an alpha olefin in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including catalyst and ionic activator present in the effluent stream from the first reactor; further provided that the total molar ratio of ionic activator to organometallic catalyst present over both reactors is at least 0.8.

Provided is a solution polymerization process wherein ethylene and optionally an alpha olefin are polymerized in a solvent in a first reactor in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; passing a polymer solution formed in the first reactor to a second reactor where ethylene and optionally an alpha olefin are polymerized in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including catalyst and ionic activator present in the polymer solution from the first reactor; further provided that the total molar ratio of ionic activator to organometallic catalyst present over both reactors is at least 0.8.

Provided is film which has good optical properties, the film comprising a polymer made in a solution polymerization process wherein ethylene and optionally an alpha olefin are polymerized in a solvent in a first reactor in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; passing a polymer solution formed in the first reactor to a second reactor where ethylene and optionally an alpha olefin are polymerized in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including catalyst and ionic activator present in the polymer solution from the first reactor; further provided that the total molar ratio of ionic activator to organometallic catalyst present over both reactors is at least 0.8.

Provided is an ethylene/alpha olefin copolymer or an ethylene homopolymer made in a solution polymerization process, wherein ethylene and optionally an alpha olefin are polymerized in a solvent in a first reactor in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; passing a polymer solution formed in the first reactor to a second reactor where ethylene and optionally an alpha olefin are polymerized in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the polymer solution passed from the first reactor; further provided that the total molar ratio of ionic activator to organometallic catalyst present over both reactors is at least 0.8.

In an embodiment of the invention, the first reactor and second reactor are stirred tank reactors.

In an embodiment of the invention, the total molar ratio of ionic activator to organometallic catalyst present over both reactors is at least 0.85.

In an embodiment of the invention, the total molar ratio of ionic activator to organometallic catalyst present over both reactors is at least 0.9.

In an embodiment of the invention, the total molar ratio of ionic activator to organometallic catalyst present over both reactors is at least 1.0.

In an embodiment of the invention, the total molar ratio of ionic activator to organometallic catalyst present over both reactors is from 0.8 to 1.5.

In an embodiment of the invention, an organometallic catalyst fed to a first reactor and to a second reactor are the same type of catalyst.

In an embodiment of the invention, the organometallic catalyst is a phosphinimine catalyst.

In an embodiment of the invention, the ionic activator is trityl borate, $Ph_3CB(C_6F_5)_4$.

In an embodiment of the invention, the organometallic catalyst, the alkylaluminoxane and the ionic activator are un-supported.

In an embodiment of the invention, the molar ratio of ionic activator to organometallic catalyst fed to the first reactor is less than 0.75.

In an embodiment of the invention, the molar ratio of ionic activator to organometallic catalyst fed to the first reactor is less than 0.5.

In an embodiment of the invention, the molar ratio of ionic activator to organometallic catalyst fed to the first reactor is less than 0.35.

In an embodiment of the invention, the molar ratio of ionic activator to organometallic catalyst fed to the first reactor is less than 0.25.

In an embodiment of the invention, the molar ratio of ionic activator to organometallic catalyst fed to the first reactor is 0.

In an embodiment of the invention, the molar ratio of ionic activator to organometallic catalyst fed to the first reactor is from 0 to 0.35.

In an embodiment of the invention, the molar ratio of ionic activator to organometallic catalyst fed to the first reactor is from 0 to 0.25.

In an embodiment of the invention, the molar ratio of ionic activator to organometallic catalyst fed to the second reactor is at least 1.75.

In an embodiment of the invention, the molar ratio of ionic activator to organometallic catalyst fed to the second reactor is at least 2.0.

In an embodiment of the invention, the molar ratio of ionic activator to organometallic catalyst fed to the second reactor is at least 2.5.

In an embodiment of the invention, the molar ratio of ionic activator to organometallic catalyst fed to the second reactor is at least 2.75.

In an embodiment of the invention, the molar ratio of ionic activator to organometallic catalyst fed to the second reactor is from 2:1 to 6:1.

In an embodiment of the invention, the molar ratio of Al from alkylaluminoxane to organometallic catalyst fed to the first and second reactor is from 10:1 to 250:1.

In an embodiment of the invention, the temperature in the first reactor is from 80° C. to 200° C. and the temperature in the second reactor is from 160° C. to 230° C.

In an embodiment of the invention, the second reactor is operated at a higher temperature than the first reactor.

In an embodiment of the invention, the organometallic catalyst has the formula, (L)(PI)MX$_2$, where M is Ti, Zr or Hf; PI is a phosphinimine ligand having the formula R$^1{}_3$P=N—, where R$^1$ is independently selected from the group consisting of hydrogen, halogen, and C$_1$-C$_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

Provided is a solution polymerization process wherein ethylene and an alpha olefin are polymerized in a solvent in a first reactor at a temperature of from 80° C. to 200° C. in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; passing a polymer solution formed in the first reactor to a second reactor where ethylene and an alpha olefin are polymerized at a temperature of from 160° C. to 230° C. in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the polymer solution passed from the first reactor; further provided that the total molar ratio of ionic activator to organometallic catalyst present over both reactors is at least 0.85.

In an embodiment of the invention, ethylene is copolymerized with 1-octene.

In an embodiment of the invention, an ethylene/1-octene copolymer is made in dual reactor solution process, wherein the first reactor is operated at from 120° C. to 160° C. and the second reactor is operated at from 160° C. to 220° C.

In an embodiment of the invention, an ethylene/1-octene copolymer having a melt index≦1 g/10 min is made in dual reactor solution process, wherein the first reactor is operated at from 120° C. to 160° C. and the second reactor is operated at from 160° C. to 220° C.

In an embodiment of the invention, an ethylene/1-octene copolymer having a melt index≧1 g/10 min is made in dual reactor solution process, wherein the first reactor is operated at from 120° C. to 160° C. and the second reactor is operated at from 160° C. to 220° C.

In an embodiment of the invention, an ethylene/alpha-olefin copolymer with a molecular weight distribution of from about 2.5 to about 4.5 and which when made into a 1 mil blown film has a haze value of less than 10% and a gloss at 45° of greater than 55, is made in dual reactor solution process.

The present invention provides an economical polymerization process which allows for an increase in operating temperature and/or an increase in hydrogen concentration in a first stage of a polymerization process, without compromising polymer molecular weight performance. Such a process has improved operability especially when used in a solution phase polymerization process operating in two reactors connected in series.

DETAILED DESCRIPTION OF PREFERRED EMBODIMENTS

The present invention is an improved process for operating a multi stage polymerization process, especially a multi reactor polymerization process. The process of the present invention also provides polymers which when made into film have improved optical properties.

The inventive process may be applied to any multi reactor polymerization system which employs a polymerization catalyst and a cocatalyst comprising an ionic activator (e.g. a trityl borate or organoborane activator) and an alkylaluminoxane compound (which can also serve as an activator, but is also used for its ability to scavenge impurities from a reactor).

Polymerization catalysts usefully employed in the present invention are organometallic catalysts, which are also known in the art as "single site" polymerization catalysts.

Suitable organometallic single site catalysts include metallocene catalysts, constrained geometry catalysts and phosphinimine catalysts all of which are well known to persons skilled in the relevant art. Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Preferably, the organometallic catalyst is based on a group 3, 4 or 5 metal (where the numbers refer to columns in the Periodic Table of the Elements using IUPAC nomenclature). Most typically, organometallic catalysts are based on metals from group 4, which includes titanium, hafnium and zirconium. The most preferred organometallic catalysts are group 4 metal complexes in their highest oxidation state.

Polymerization catalysts, such as the organometallic catalysts described herein, usually require activation by one or more cocatalytic or activator species in order to provide polymer. Hence, polymerization catalysts are sometimes called "pre-catalysts".

Particularly suitable for high temperature solution polymerization processes are phosphinimine catalysts which are further described below.

A phosphinimine catalyst is an organometallic compound based on a group 3, 4 or 5 metal and which is characterized as having at least one phosphinimine ligand. Any organometallic compounds/complexes having a phosphinimine ligand and which display catalytic activity for ethylene (co)polymerization are contemplated for use in the current invention.

In an embodiment of the invention, a phosphinimine catalyst is defined by the formula: $(L)_n(PI)_mMX_p$ where M is a transition metal selected from Ti, Hf, Zr; PI is a phosphinimine ligand; L is a cyclopentadienyl type ligand or a heteroatom ligand; X is an activatable ligand; m is 1 or 2; n is 0 or 1; and p is determined by the valency of the metal M.

The phosphinimine ligand is defined by the formula: $R^1_3P=N-$ wherein each $R^1$ is independently selected from the group consisting of a hydrogen atom; a halogen atom; $C_{1-20}$ hydrocarbyl radicals which are unsubstituted by or further substituted by one or more halogen atom; a $C_{1-20}$ alkyl radical; a $C_{1-8}$ alkoxy radical; a $C_{6-10}$ aryl or aryloxy radical; an amido radical; a silyl radical of the formula: $-SiR^2_3$ wherein each $R^2$ is independently selected from the group consisting of hydrogen, a $C_{1-8}$ alkyl or alkoxy radical, $C_{6-10}$ aryl or aryloxy radicals; and a germanyl radical of the formula: $-GeR^2_3$ wherein $R^2$ is as defined above.

In an embodiment of the invention the phosphinimine ligand is chosen so that each $R^1$ is a hydrocarbyl radical. In a particular embodiment of the invention, the phosphinimine ligand is tri-(tertiarybutyl)phosphinimine (i.e. where each $R^1$ is a tertiary butyl group).

In an embodiment of the invention, the phosphinimine catalyst is a group 4 organometallic complex which contains one phosphinimine ligand (as described above) and one ligand L which is either a cyclopentadienyl-type ligand or a heteroatom ligand.

As used herein, the term "cyclopentadienyl-type" ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of a $C_{1-10}$ hydrocarbyl radical (which hydrocarbyl substituents are unsubstituted or further substituted by for example a halogen atom); a halogen atom; $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $-Si(R)_3$ wherein each R is independently selected from the group consisting of hydrogen, a $C_{1-8}$ alkyl or alkoxy radical, $C_{6-10}$ aryl or aryloxy radicals; and germanyl radicals of the formula $-Ge(R)_3$ wherein R is as defined directly above.

As used herein, the term "heteroatom ligand" refers to a ligand which contains at least one heteroatom selected from the group consisting of boron, nitrogen, oxygen, phosphorus or sulfur. The heteroatom ligand may be sigma or pi-bonded to the metal. Exemplary heteroatom ligands include but are not limited to "silicon containing" ligands, "amido" ligands, "alkoxy" ligands, "boron heterocycle" ligands and "phosphole" ligands.

Silicon containing ligands are defined by the formula: $-(\mu)SiR^xR^yR^z$ where the "—" denotes a bond to the transition metal and $\mu$ is sulfur or oxygen. The substituents on the Si atom, namely $R^x$, $R^y$ and $R^z$ are required in order to satisfy the bonding orbital of the Si atom. The use of any particular substituent $R^x$, $R^y$ or $R^z$ is not especially important. It an embodiment of the invention, each of $R^x$, $R^y$ and $R^z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and may optionally be substituted (e.g. 2,6 di-tertiary butyl phenoxy).

The "boron heterocyclic" ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659 and 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4H_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116.

The term "activatable ligand" refers to a ligand which may be activated by a cocatalyst (also referred to as an "activator"), to facilitate olefin polymerization. Examples of activatable ligands include those independently selected from the group consisting of a hydrogen atom; a halogen atom; a $C_{1-10}$ hydrocarbyl radical; a $C_{1-10}$ alkoxy radical; a $C_{5-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals;

and a phosphido radical which is unsubstituted or substituted by up to two $C_{1-8}$ alkyl radicals.

The number of activatable ligands depends upon the valency of the metal and the valency of the activatable ligand. The preferred organometallic catalysts are based on group 4 metals in their highest oxidation state (i.e. 4+). Suitable activatable ligands are monoanionic such as a halide (e.g. chloride) or an alkyl (e.g. methyl, benzyl).

In some instances, the metal of the organometallic catalyst component may not be in the highest oxidation state. For example, a titanium (III) component would contain only one activatable ligand.

In an embodiment of the invention, the organometallic catalyst has the formula, (L)(PI)MX$_2$, where M is Ti, Zr or Hf; PI is a phosphinimine ligand having the formula $R^1{}_3P=N-$, where $R^1$ is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

In an embodiment of the invention, the organometallic catalyst has the formula, (Cp)(PI)MX$_2$, where M is Ti, Zr or Hf; PI is a phosphinimine ligand having the formula $R^1{}_3P=N-$, where $R^1$ is independently selected from the group consisting of hydrogen, halogen, and $C_1$-$C_{20}$ hydrocarbyl; Cp is an unsubstituted cyclopentadienyl ligand or a singly or multiply substituted cyclopentadienyl; and X is an activatable ligand.

In an embodiment of the invention, the organometallic catalyst contains a phosphinimine ligand, a cyclopentadienyl ligand and two chloride or two methyl ligands bonded to the group 4 metal.

The organometallic catalyst components of the current invention are used in combination with at least one cocatalyst (or "activator") to form an active polymerization catalyst system for olefin polymerization. Cocatalysts include ionic activator cocatalysts and alkylaluminoxane cocatalysts.

An alkylaluminoxane may be of the formula: $(R^4)_2AlO(R^4AlO)_mAl(R^4)_2$ wherein each $R^4$ is independently selected from the group consisting of $C_{1-20}$ hydrocarbyl radicals and m is from 0 to 50. In an embodiment of the invention, $R^4$ is a $C_{1-4}$ alkyl radical and m is from 5 to 30. Well known, commercially available alkylaluminoxanes include methylaluminoxane (or "MAO") in which each R is methyl and modified methylaluminoxane ("MMAO") in which each R is mainly methyl, but is also a longer chain alkyl in smaller amounts, which helps to improve solubility in hydrocarbon solvents.

The use of an alkylaluminoxane cocatalyst generally requires an excess molar ratio of aluminum to the transition metal in the organometallic catalyst. Ratios of from 5:1 to 1000:1 may be used. In an embodiment of the invention, the molar ratio used is from about 20:1 to about 250:1.

The so called "ionic activators" which most typically comprise organoborane moieties are well known cocatalysts for single site catalysts. See, for example, U.S. Pat. Nos. 5,198,401 and 5,132,380.

Without wishing to be bound by theory, ionic activators include activators that activate the organometallic complex by protonolysis of a suitable activatable ligand or by the electrophilic abstraction of a suitable activatable ligand. Although the "ionic activator" may abstract or cleave one or more activatable ligand so as to ionize the catalyst center into a "cation", it does not covalently bond with the catalyst, providing instead, sufficient distance between the catalyst metal center and the ionizing activator to permit a polymerizable olefin to enter the resulting active site.

Preferred ionic activators are boron-containing ionic activators described as: (i) compounds of the formula $[R^5]^+[B(R^7)_4]^-$ wherein B is a boron atom, $R^5$ is an aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $-Si(R^9)_3$; wherein each $R^9$ is independently selected from the group consisting of a hydrogen atom and a $C_{1-4}$ alkyl radical; (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$, alkyl radicals, a phenyl radical which is unsubstituted or substituted by up to three $C_{1-4}$ alkyl radicals, or one $R^8$ taken together with the nitrogen atom (i.e. where Z=N) may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom (i.e. where Z=N) forms an anilinium radical which is substituted by two $C_{1-4}$ alkyl radicals.

The "ionic activator" may abstract one or more activatable ligands so as to ionize the organometallic catalyst center into a cation but not to covalently bond with the catalyst and to provide sufficient distance between the catalyst and the ionizing activator to permit a polymerizable olefin to enter the resulting active site.

Some non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-dimethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium) tetrakispentafluorophenyl borate, tropillium phenyltrispentafluorophenyl borate, triphenylmethylium phenyltrispentafluorophenyl borate, benzene(diazonium) phenyltrispentafluorophenyl borate, tropillium tetrakis(2,3,5,6-tetrafluorophenyl)borate, triphenylmethylium tetrakis(2,3,5,6-tetrafluorophenyl)borate, benzene (diazonium)tetrakis(3,4,5-trifluorophenyl)borate, tropillium tetrakis(3,4,5-trifluorophenyl)borate, benzene(diazonium)tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium)tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium)tetrakis(2,3,4,5-tetrafluorophenyl)borate.

Commercially available ionic activators include: N,N-dimethylaniliniumtetrakispentafluorophenyl borate, triphenylmethylium tetrakispentafluorophenyl borate and trispentafluorophenyl borane.

The organometallic catalyst and cocatalysts of the present invention may in some cases be supported on an inert support material, but it is preferable to use the organometallic catalyst and cocatalyst components of the present invention in unsupported form.

The inventive process of the current invention may, in particular, be usefully employed in dual reactor systems, such as in-series dual reactor systems. For example, dual reactor systems which comprise slurry phase polymerization reactor systems, solution phase polymerization reactor systems and combinations thereof may be employed with the current invention. Although less preferred, gas phase polymerization reactor systems may also be used with the process of the current invention.

In an embodiment of the invention, polymerization takes place in two reactors which are configured in-series. The reactors can be the same or different. For example the reactors can each be continuously stirred tank reactors suitable for solution polymerization. The reactors can be operated under common or different conditions. For example, the reactors can be operated under conditions which promote the formation of a high molecular weight polymer fraction in a first (i.e. upstream) reactor and the formation of a low molecular weight polymer fraction in a second (i.e. downstream) reactor which receives an effluent stream from the first reactor.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon that may be un-substituted or substituted by a $C_{1-4}$ alkyl radical. Some potential diluents include pentane, hexane, heptane, octane, isobutene cyclohexane and methylcyclohexane. The diluent may be hydrogenated naphtha. The diluent may also be a $C_{8-12}$ aromatic hydrocarbon such as that sold by Exxon Chemical Company under the trademark ISOPAR® E. Typically, monomers are dispersed or dissolved in the diluent. The polymerization reaction takes place at temperatures from about 20° C. to about 120° C., preferably from about 40° C. to 100° C. The pressure in the reactor may be from about 15 psi to about 4,500 psi, preferably from about 100 to 1,500 psi. The reactors may be stirred tank or "loop" reactors with a settling leg to remove product polymer. Stirred tank reactors may also be used. The solids content of the suspension is generally in the range from 10 to 80%. The polymerization can be carried out either batchwise, e.g. in stirring autoclaves, or continuously, e.g. in tube reactors, or in loop reactors.

In gas phase polymerization, pressures can be in the range of 25 to 1000 psi, preferably 50 to 500 psi, most preferably 100 to 450 psi, and temperatures will be in the range of from 30 to 130° C., preferably 65 to 115° C. Stirred or preferably fluidized bed gas phase reactors can be used. In the gas phase fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone that contributes to fluidization of the bed. The gas phase polymerization may be conducted in dry mode, condensed mode or super condensed mode, all of which are well known in the art. Polymerization may take place in the presence of a non polymerizable gas that may be inert or may be an alkane, or a mixture thereof and typically hydrogen. For a detailed description of gas phase fluidized bed polymerization processes see U.S. Pat. Nos. 4,543,399; 4,588,790; 5,028,670; 5,352,749 and 5,405,922.

Solution polymerization processes for the polymerization or copolymerization of ethylene are well known in the art (see for example U.S. Pat. Nos. 6,372,864 and 6,777,508). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are linear low density polyethylenes (LLDPE's) which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc, the so-called very low and ultra low density polyethylenes.

Generally the alpha olefin may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

For an in-series solution phase dual reactor system, is it generally desirable to operate the second reactor, which may be immediately upstream of a devolatilization system, at higher temperature than the first reactor, since the temperature of the polymerization reaction can be used to help flash off the reaction solvent. For a given catalyst system, a temperature difference between the first and second reactors can influence the molecular weight distribution (MWD) of the final polymer, with larger temperature differences favoring increased MWD.

In solution polymerization, the monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the first reactor. Additional monomers and solvent may be added to the second reactor, and it may be heated or cooled.

Generally, the catalyst components (i.e. the organometallic catalyst, an ionic activator and an alkylaluminoxane) may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555).

While the operating temperatures used in each reactor will vary widely depending on multiple factors such as for example the monomer concentration, the comonomer concentration, the catalyst type and concentration, the solvent used, pressure, equipment design, flow rates, the desired product properties and the like, the first reactor is generally operated at a temperature of between 80° C. and 200° C., while the second reactor is generally operated at a temperature of between 100° C. and 250° C.

In a solution polymerization process, the most preferred reaction process is a "medium pressure process", meaning that the pressure in each reactor is preferably less than about 6,000 psi (about 42,000 kilopascals or kPa), most preferably from about 2,000 psi to 3,000 psi (about 14,000–22,000 kPa).

The residence time in each reactor will depend on the design and the capacity of the particular reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor. On leaving the reactor system the solvent is removed and the resulting polymer is finished in a conventional manner.

In an embodiment of the invention, the first polymerization reactor has a smaller volume than the second polymerization reactor.

In an embodiment of the invention, the first polymerization reactor is operated at a lower temperature than the second reactor.

Catalyst Activation

In the present invention, it is essential that a substoichiometric amount of an ionic activator relative to an organometallic catalyst be combined in a first stage of a polymerization process, and that a stoichiometric excess of an ionic activator relative to an organometallic catalyst be combined in a second stage of a polymerization process. In the current invention, the stoichiometric excess used in the second stage must be at least 1.5:1 in terms of the molar ratio of ionic activator to organometallic catalyst combined.

Herein, the stoichiometric excess considers only the organometallic catalyst and ionic activator freshly fed to a reactor during the second stage of the polymerization process. Accordingly, where two reactors are used in series, the stoichiometric excess does not include those amounts of ionic activator and organometallic catalyst that may be present in an effluent stream fed from a first reactor to a second reactor or present in a polymer solution passed from a first reactor to a second reactor.

In the present invention, the terms "substoichiometric" or "substoichiometric amount" and the like are defined as a molar ratio of ionic activator to organometallic catalyst which less than 1.0 (i.e. the molar ratio will be <1:1)

In the present invention, the terms "superstoichiometric", "superstoichiometric amount" and the like are defined as a molar ratio of ionic activator to organometallic catalyst which exceeds 1.5 (i.e. the molar ratio will be >1.5:1).

In an embodiment of the invention, in a first stage of a polymerization process, a molar excess of methylaluminoxane and a substoichiometric amount of trityl borate, both relative to an organometallic catalyst is added to a reactor, and in a second stage of the polymerization process a molar excess of methylaluminoxane and a superstoichiometric amount of trityl borate, both relative to an organometallic catalyst, is added to a reactor.

In an embodiment of the invention, an organometallic catalyst fed to a reactor in a first stage and an organometallic catalyst fed to a reactor in a second stage are the same catalyst.

In an embodiment of the invention, the first and second stage of the polymerization process are separated temporally and are carried out in the same polymerization zone or reactor.

In a preferred embodiment of the invention, the first and second stage of the polymerization process are carried out in first and second reactors connected in series, respectively.

In an embodiment of the invention, the polymerization is slurry phase polymerization and can take place in a single reactor or in two reactors connected in series.

In an embodiment of the invention, the polymerization is a solution phase polymerization and can take place in a single reactor or in two reactors connected in series.

Preferably, the polymerization of the present invention will be carried out in the solution phase using two reactors connected in series and a polymer product solution formed in a first reactor is continuously feed to a second reactor. Continuous stirred tank reactors may be conveniently used, although other reactor types and configurations (e.g. in-series-solution loop reactors) are contemplated.

For a dual reactor solution process, as will be further illustrated in the examples, it is essential that a substoichiometric amount of an ionic activator relative to the organometallic catalyst be fed to a first reactor, and that a stoichiometric excess of an ionic activator relative to the organometallic catalyst be freshly fed to a second reactor which receives polymer solution effluent from the first reactor. It is preferable for the overall molar ratio of ionic activator to organometallic catalyst present over both reactor be at least 0.8. An alkylaluminoxane is also fed to either or both or the first and second reactors. Preferably, an alkylaluminoxane is fed to both reactors. The alkylaluminoxane is used in a molar excess relative to the organometallic catalyst, typically at a molar ratio (based on Al to organometallic catalyst) of from 10:1 to 250:1 in each reactor (although narrower ranges within this range are also contemplated and include for example a molar ratio of from 10:1 to 200:1, or from 10:1 to 150:1, etc.; the molar ratio of Al to organometallic catalyst fed to each reactor may also be different). As discussed above, the stoichiometric excess of ionic activator fed to the second reactor must be at least 1.5:1 in terms of the molar ratio of ionic activator to organometallic catalyst fed to the second reactor (and not including ionic activator and organometallic catalyst which may be present in a polymer solution passed from the first reactor to the second reactor). Such an excess is herein referred to as a "superstoichiometric" amount.

In an embodiment of the invention, the organometallic catalyst fed to the first reactor and the organometallic catalyst fed to the second reactor are the same catalyst.

In an embodiment of the invention, the following conditions are used for a solution polymerization process: (i) ethylene and optionally an alpha olefin are polymerized in a solvent in a first reactor in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0; (ii) the polymer solution formed in the first reactor is passed to a second reactor where ethylene and optionally an alpha olefin are polymerized in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the polymer solution passed from the first reactor; and (iii) the total molar ratio of ionic activator to organometallic catalyst present over both reactors is at least 0.8.

In specific embodiments of the invention, the molar ratio of ionic activator to organometallic catalyst fed to the first reactor is less than 1.0, or less than 0.75, or less than 0.5, or less than 0.35, or less than 0.25, or from 0 to 0.25, or from 0 to 0.35, or from 0.10 to 0.35, or from 0.15 to 0.35.

In specific embodiments of the invention, the molar ratio of ionic activator to organometallic catalyst fed to the first reactor is 0, or from 0 to 0.25.

In specific embodiments of the invention, the molar ratio of ionic activator to organometallic catalyst freshly fed to the second reactor is at least 1.5, or at least 1.75 or at least 2.0, or at least 2.5, or at least 2.75 or at least 3.0.

There is no specific upper limit for the molar ratio of ionic activator to organometallic catalyst freshly fed to the second reactor. However, for convenience, cost and optimal polymer metal residues, in some specific embodiments of the invention, the molar ratio of ionic activator to organometallic catalyst freshly fed to the second reactor will be from 1.5 to 15, or from 1.75 to 10 of from 2 to 6, or from 2 to 4.

In an embodiment of the invention, the molar ratio of ionic activator to organometallic catalyst freshly fed to the second reactor is from 2:1 to 6:1.

In specific embodiments of the invention, the total molar ratio of ionic activator to organometallic catalyst added over both reactors is at least 0.8, or at least 0.85, or at least 0.9, or at least 0.95, or at least 1.0. In further embodiments of the invention, the total molar ratio of ionic activator to organometallic catalyst added over both reactors will be 1.0 or close to 1.0 (e.g. from 0.8 to 1.2).

Figure 1:
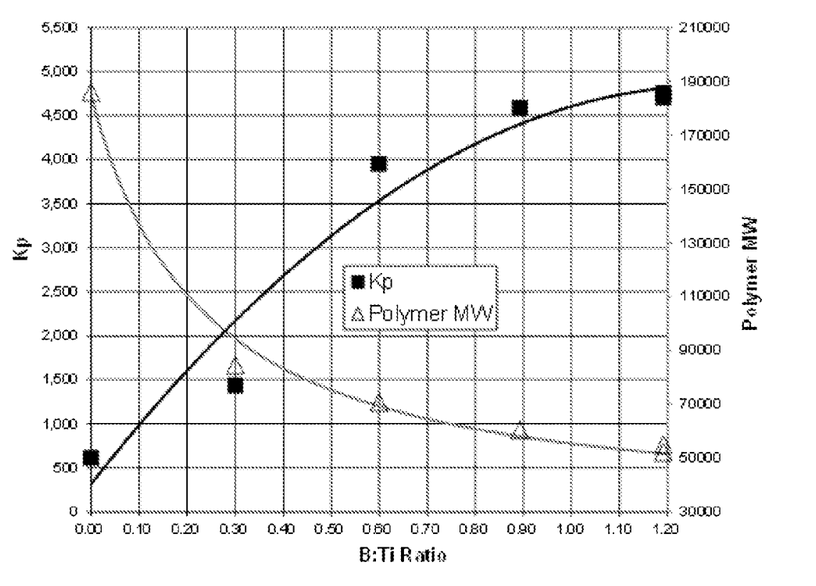
FIG. 1 shows the effect of the ionic activator/catalyst molar ratio on polymer molecular weight (M$_w$) and catalyst activity (Kp) while holding ethylene conversion (Q=90%), temperature (160° C.) and hydrogen concentration constant in a stirred tank solution phase polymerization reactor. The molar ratio of methylaluminoxane to catalyst in each run is 80/1.

As will be discussed further in the Examples and with reference to FIG. 1, during in-series dual reactor solution polymerization, the use of substoichiometric amounts of ionic activator (in the presence of excess alkylaluminoxane) in a first solution phase reactor allowed access to higher molecular weight polymer, but with reduced catalyst activity. As such, higher catalyst feed rates to the first reactor are required to maintain polymer production targets. As will also be discussed further in the Examples and with reference to Table 3, adding a "superstoichiometric" amount of ionic activator to the second reactor restored much of the catalyst activity loss in the first reactor and without sacrificing higher molecular weight performance.

Without wishing to be bound by theory, it seems that poorly active catalyst flowing from the first reactor can be "reactivated" in the second reactor. Hence, high catalyst feed rates to the first reactor can be tolerated, since the required amount of fresh catalyst fed to the second reactor can be reduced. As a result, the current invention allows for the formation of high molecular weight polymer at high temperature while not significantly impacting process economics or increasing metal residues in the final product. Alternatively, the current invention allows for the economical production of a polymer target having a given melt index (or molecular weight), but at higher temperatures and/or increased hydrogen concentrations in the first polymerization reactor. By making such process "knobs" available, overall process operability is improved.

In an embodiment of the invention, an ethylene/1-octene copolymer is made in dual reactor solution process, wherein the first reactor is operated at between 120° C. and 160° C. and the second reactor is operated at between 160° C. and 220° C.

In embodiments of the current invention, an ethylene/1-octene copolymer having a melt index $(I_2) \geq 1.0$ g/10 min, or $\leq 1.0$ g/10 min is made.

Polymer Optical Properties

Under the process conditions of the current invention (see "Catalyst Activation" section above), ethylene/alpha-olefin copolymers produced give rise to film having improved optical properties, as measured in haze and gloss, relative to film made from an ethylene/alpha-olefin copolymer not made under the conditions of the invention.

In an embodiment of the invention, an ethylene/alpha-olefin copolymer with a molecular weight distribution of from about 2.0 to about 4.5, when made into a 1 mil blown film, has a haze value of less than 10% and a gloss at 45° of greater than 50.

In an embodiment of the invention, an ethylene/alpha-olefin copolymer with a molecular weight distribution of from about 2.5 to about 4.5, when made into a 1 mil blown film, has a haze value of less than 10% and a gloss at 45° of greater than 50.

In an embodiment of the invention, a film made from an ethylene/alpha-olefin copolymer with a molecular weight distribution of from about 2.5 to about 4.5, has at a 1 mil blown film thickness, a haze value of less than 10% and a gloss at 45° of greater than 50.

In an embodiment of the invention, a film made from an ethylene/alpha-olefin copolymer with a molecular weight distribution of from about 2.5 to about 4.5, has at a 1 mil blown film thickness, a haze value of less than 10% and a gloss at 45° of greater than 55.

EXAMPLES

General Considerations

Purchased cyclohexane was dried and deoxygenated by passing it through a bed of deoxygenation catalyst (brand name R311 from BASF), an alumina bed (brand name Selexsorb COS/CD), and a molesieve (3A/13X) bed.

Purchased o-xylene was further purified by passing through the same purification beds as described for cyclohexane purification.

Ethylene was purchased from Praxair as polymer grade. The ethylene was purified and dried by passing the gas through a series of purification beds including: alumina (brand: Selexsorb COS), molecular sieve (type: 13X), and a deoxygenation bed (brand: Oxiclear®).

1-Octene was purchased from Praxair. The 1-octene was purified and dried by passing over a series of purification beds including: alumina (brand: Selexsorb CDO-200), molecular sieve (type: 3 Å) and a deoxygenation bed (brand: BASF-R311).

Cyclopentadienyltitanium-(tri-tert-butylphosphinimino) dichloride was synthesized according to procedure disclosed in the publication (*Organometallics*, 2003, 22, 1937-1947) and confirmed with $^1$H-NMR for >95% purity.

Tritylborate (triphenylmethylium tetrakispentafluorophenyl borate) was purchased from Albemarle with minimum 97% of purity.

MMAO-7 in a mixed alkane solvent (sold under the trademark ISOPAR E) was purchased from Akzo Nobel containing 13.0 wt % of Al.

4-ethyl-2,6-di-tert-butyl phenol ("phenol") was purchased from Aldrich with 99% of purity.

Isopropanol was purchased and used without further purification.

Polyethylene composition density (g/cm$^3$) was measured according to ASTM D792. Melt indexes, $I_2$, $I_6$ and $I_{21}$ for the polyethylene composition were measured according to ASTM D1238 (when conducted at 190° C., using a 2.16 kg, a 6.48 kg and a 21 kg weight respectively).

Molecular weights $M_n$, $M_w$, and $M_z$ (g/mol) were determined by high temperature Gel Permeation Chromatography (GPC), using an instrument sold under the trade name "Waters 150 c", with 1,2,4-trichlorobenzene as the mobile phase at 140° C. with differential refractive index detection using universal calibration (e.g. ASTM D6474-99). The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$.

Stress exponent is determined by measuring the throughput of a melt indexer at two stresses (2,160 g and 6,480 g loading) using the procedures of the ASTM melt index test method, and the following formula: Stress exponent=1/0.477×log (wt. of polymer extruded with 6480 g wt.)/(wt. of polymer extruded with 2160 g wt.). The stress exponent is calculated using the following formula: $Log_{10}[I_6/I_2]/Log_{10}$ [6.48/2.16]. Stress exponent values of less than about 1.40 indicate narrow molecular weight distribution while values above about 1.70 indicate broad molecular weight distribution.

Continuous Solution Phase Polymerization in a Single Reactor

Continuous polymerizations were conducted on a continuous polymerization unit (CPU) using cyclopentadienyltitanium-(tri-tert-butylphosphinimino) dichloride as the organometallic catalyst. The CPU contained a 71.5 mL stirred reactor and was operated between 160-280° C. for the polymerization experiments. An upstream mixing reactor having a 20 mL volume was operated at 5° C. lower than the polymerization reactor to a maximum 220° C. The mixing reactor was used to pre-heat the ethylene, octene and some of the solvent streams. Catalyst feeds and the rest of the solvent were added directly to the polymerization reactor as a continuous process. A total continuous flow of 27 mL/min into the polymerization reactor was maintained. MMAO and phenol solutions were premixed prior to entering the reactor and the catalyst and the trityl borate were premixed before entering the reactor. The catalyst was activated in situ (in the polymerization reactor) at the reaction temperature in the presence of the monomers. Ethylene was supplied to the reactor by a calibrated thermal mass flow meter and was dissolved in the reaction solvent prior to the polymerization reactor. The comonomers were premixed with the ethylene before entering the polymerization reactor. Internal reaction temperature is monitored by a thermocouple in the polymerization medium and can be controlled at the required set point to ±0.5° C. Ethylene and 1-octene copolymer was made at 1-octene/ethylene weight ratio of 0.5 and 1. The CPU system operated at a pressure of 10.5 MPa. The solvent, monomer, and comonomer streams were all purified by the CPU systems before entering the reactor. Q is the percent ethylene conversation (and determined by an online gas chromatograph (GC)) and polymerization activity Kp is defined as:

$$Kp=(Q/100-Q)(1/\text{catalyst concentration})(1/\text{HUT})$$

wherein Q is defined as above of ethylene monomer converted; HUT is a hold up time in the polymerization reactor expressed in minutes and maintained constant throughout the experimental program; and the catalyst concentration is the concentration in the polymerization reactor expressed in mmol of Ti per liter.

Downstream of the reactor the pressure was reduced from the reaction pressure (1500 psi) to atmospheric pressure. The solid polymer was then recovered as a slurry in the condensed solvent and was dried by evaporation and vacuum oven before analysis.

In this set of experiments, polymerization temperature, hydrogen concentration and ethylene conversion was kept constant while the molar ratio of ionic activator to organometallic catalyst was changed. MMAO was added so that the molar ratio of Al/Ti was constant at 80. All polymerization experiments were conducted at 160° C. and polymers were collected at 90%±1 ethylene conversion. Polymerization performance and polymer property data are shown in Table 1 and FIG. 1. Table 1 shows the effect of the presence and absence of the trityl borate ionic activator on the catalyst activity and the polymer molecular weight. The molar ratio of ionic activator to organometallic catalyst used was 1.2:1. The molar ratio of aluminum (from MMAO) to titanium (from catalyst) was 80:1. FIG. 1 shows the effect of the molar ratio of ionic activator to organometallic catalyst on polymer molecular weight and catalyst activity.

TABLE 1

Effect of Different Activator on Catalyst Activity (Kp) and Polymer Mol. Weight ($M_w$)

| Catalyst | Activator | Kp (1/mM min) | Polymer Mw | Mw/Mn |
|---|---|---|---|---|
| CpTiNP($^t$Bu)$_3$Cl$_2$ | Ph$_3$CB(C$_6$F$_5$)$_4$ + MMAO | 4700 | 5500 | 1.9 |
| CpTiNP($^t$Bu)$_3$Cl$_2$ | MMAO | 600 | 186000 | 1.9 |

Table 1 clearly shows that use of a cocatalyst comprising methylaluminoxane and trityl borate leads to increased molecular weight when a substoichiometric amount of trityl borate is present relative to catalyst. There is also a drop in activity when the ionic activator is absent.

The data represented in FIG. 1, further show that the effect of the ionic activator/organometallic catalyst molar ratio on the polymer molecular weight gets more pronounced at lower molar ratios and is especially dramatic for ratios of below about 0.5. The data also show that a corresponding reduction in catalyst activity occurs as the ionic activator/organometallic catalyst molar ratio is decreased and that in order to maintain the same overall conversion rates additional catalyst must be feed to the reactor.

Without wishing to be bound by theory, these results support the notion that catalyst activated by MMAO leads to a lower activity catalytic species, but one which produces a higher molecular weight polymer, while catalyst activated by trityl borate provide a higher activity catalytic species, but one which produces a lower molecular weight polymer.

Dual Reactor Solution Polymerizations

The following examples illustrate the continuous solution copolymerization of ethylene and octene at medium pressure in a dual reactor system connected in series. The examples used a first reactor which operated at a relatively lower temperature (see Tables 2 and 3). The first reactor pressure was about 17,000 kPa (about $2.5 \times 10^3$ psi), and the second reactor pressure was marginally lower (to facilitate flow from the first to second reactor). The contents from this reactor flowed into a larger, second polymerization reactor which operated at a relatively higher temperature (see Tables 2 and 3). The first reactor had a volume of 12 liters and the second reactor had a volume of 24 liters. Both reactors were agitated to ensure good mixing of the reactor contents. The process was continuous in all feed streams (i.e. solvent, which was methyl pentane; monomers and catalyst and cocatalyst components) and in the removal of product. Monomer and comonomer were purified prior to addition to the reactor using conventional feed preparation systems (such as contact with various absorption media to remove impurities such as water, oxygen and polar contaminants). The reactor feeds were pumped to the reactors at concentrations and ratios shown in Tables 2 and 3. Average residence times for the reactors are calculated by dividing average flow rates by reactor volume. The residence time in each reactor for all of the inventive experiments was less than 1.5 minutes and the reactors were well mixed.

The organometallic catalyst used in all experiments was a titanium (IV) complex having one cyclopentadienyl ligand, two chloride ligands and one tri(tertiary butyl)phosphinimine ligand as is represented by the formula "CpTiNP($^t$Bu)$_3$Cl$_2$". The amount of catalyst fed to each reactor (expressed in ppm fed to a reactor relative to the total weight of all streams flowing to a reactor) is shown in Tables 2 and 3.

The cocatalyst used comprised commercially available alkylaluminoxane and a commercially available ionic activator compound. More specifically, a modified methylaluminoxane (purchased from Akzo-Nobel, under the tradename "MMAO-7") was used in combination with triphenylmethylium tetrakispentafluorophenyl borate "Ph$_3$CB(C$_6$F$_5$)$_4$" (purchased from Asahi Glass) in all experiments. A hindered phenol (2,6-di-tert-butyl-4-ethyl-phenol) "the phenol" was also used.

The amount ratios of alkylaluminoxane and ionic activator fed to each reactor is shown in Tables 2 and 3 and is expressed as the Al/Ti or the B/Ti mole ratio respectively, relative to the titanium contained in the organometallic catalyst.

Reactor 1, the first reactor may be referred to as R1. Reactor 2, the second reactor may be referred to as R2.

Some physical properties of the resulting LLDPE products are also shown in Tables 2 and 3.

Comparative Examples 1-5

The relevant data is given in Table 2. In Examples 1-4, a polymer having a fractional melt index ($I_2$<1 g/10 min), density (d=ca. 0.914 g/cc) and stress exponent (stress=ca. 1.26) was targeted. In Example 5, a polymer having a fractional melt index ($I_2$<1 g/10 min), density (d=ca. 0.916 g/cc) and stress exponent (stress=ca. 1.26) was targeted. Various ionic activator to organometallic catalyst molar ratios (i.e. B:Ti molar ratios of 1.1:1; 0.5:1; 0.25:1, 0:1 and 1.17:1) were fed to a first polymerization reactor (R1), while the R1 Al:Ti ratio was kept constant at 100:1, in order to explore the effect of the B:Ti ratio on polymer molecular weight, catalyst activity (i.e. catalyst feed rates) and overall process economics. The R2 B:Ti ratio was kept constant at a small stoichiometric excess of approximately 1.2:1. The R2 Al:Ti ratio was kept constant at 25:1. Ethylene conversion rates in each reactor were held constant, so that an increased catalyst feed to a particular reactor reflects a decrease in catalyst activity.

TABLE 2

| | Example | | | | |
|---|---|---|---|---|---|
| | Comp. 1 | Comp. 2 | Comp. 3 | Comp. 4 | Comp. 5 |
| Octene/ethylene in fresh feed | 0.83 | 0.85 | 0.81 | 0.75 | 0.81 |
| Reactor 1 (R1) | | | | | |
| Mean Temperature (° C.) | 133.1 | 133 | 139.1 | 161.3 | 140 |
| Ethylene conversion | 83.83 | 84.08 | 83.98 | 85.89 | 78.21 |
| Hydrogen Feed (ppm) | 0.45 | 0.6 | 1.5 | 1.5 | 0.76 |
| Catalyst (ppm) to R1 | 0.15 | 0.28 | 0.47 | 1.07 | 0.077 |
| Al/Ti (mol/mol) | 100 | 100 | 100 | 100 | 100 |
| B/Ti (mol/mol) | 1.1 | 0.5 | 0.25 | 0 | 1.17 |
| Reactor 2 (R2) | | | | | |
| Mean Temperature (° C.) | 187.5 | 186.7 | 186.3 | 185.6 | 181.9 |
| Ethylene conversion | 86.99 | 87.03 | 87.05 | 87.03 | 83.01 |
| Hydrogen Feed (ppm) | 0.80 | 0.80 | 0.80 | 0.80 | 0.80 |
| Catalyst (ppm) to R2 | 0.28 | 0.34 | 0.38 | 0.56 | 0.141 |
| Al/Ti (mol/mol) | 25 | 25 | 25 | 25 | 25 |
| B/Ti (mol/mol) | 1.2 | 1.2 | 1.2 | 1.2 | 1.27 |
| Overall (R1 + R2) | | | | | |
| Total catalyst (ppm) | 0.4 | 0.5 | 0.7 | 1.2 | 0.19 |
| Total B/Ti over R1 + R2 (mol/mol) | 1.17 | 0.94 | 0.77 | 0.58 | 1.25 |

TABLE 2-continued

|  | Example | | | | |
|---|---|---|---|---|---|
|  | Comp. 1 | Comp. 2 | Comp. 3 | Comp. 4 | Comp. 5 |
| Polymer No. | PS-91124 |  |  |  | PS-96896 |
| Density (g/cc) | 0.9134 | 0.9125 | 0.9125 | 0.9123 | 0.9155 |
| MI (melt index, $I_2$ in g/10 min) | 0.71 | 0.46 | 0.65 | 0.63 | 0.68 |
| S. Ex. | 1.27 | 1.27 | 1.26 | 1.24 | 1.24 |

From that data in Table 2, it can be seen that when the R1 B:Ti ratio was lowered from 1.1 to 0.5 (compare comp. examples 1 and 2) the catalyst feed to R1 nearly doubled, consistent with reduced catalyst activity. There was also a corresponding decrease in the polymer melt index (the polymer molecular weight increased). Interestingly the catalyst feed to R2 also increased which suggests that when stoichiometric levels of ionic activator and catalyst are fed to R1 (i.e. B:Ti is ca. 1:1) some of the catalyst formed in R1 ends up contributing to the polymerization in R2 and that the amount of this contributing catalyst species is reduced if substoichiometric levels of ionic activator are fed to R1.

The trend just discussed continues for even lower molar ratios of B:Ti being fed to R1 (compare examples 1 and 2 with examples 3 and 4). In comp. example 3, at a R1, B:Ti molar ratio of 0.25, significantly higher R1 hydrogen concentrations (an additional 1.05 ppm) and higher R1 temperatures (6° C. higher) are required to make product having the target melt index. The R1 catalyst feed level also increased approximately threefold (i.e. the catalyst activity dropped further).

In comp. example 4, no ionic activator was fed to R1 and this required still higher R1 hydrogen concentrations (hydrogen maxed out at 1.5 ppm) together with higher temperatures (28° C. higher) in order to produce polymer having the target melt index, density and stress exponent. With no ionic activator being fed to R1 the catalyst feed level to R1, went up by ~7x and the overall catalyst feed level over both reactors (R1+R2) went up by ~3x.

The above results are consistent with the CPU experiments which indicate that: 1) alkylaluminoxane activation provides a less active catalyst, but one which intrinsically makes a higher molecular weight polymer and 2) catalyst activation by an ionic activator such as trityl borate provides a catalyst species that is more active but which intrinsically makes lower molecular weight polymer.

Inventive Examples 6-10

Recovering Catalyst Activity

The relevant data are shown in Table 3. In examples 6-9, a polymer having a fractional melt index ($I_2$<1 g/10 min), density (d=ca. 0.914 g/cc) and stress exponent (stress=ca. 1.26) was targeted. In example 10, a polymer having a fractional melt index ($I_2$<1 g/10 min), density (d=ca. 0.916 g/cc) and stress exponent (stress=ca. 1.26) was targeted. Various substoichiometric amounts of ionic activator (e.g. B:Ti molar ratios of 0.2:1, 0.1:1, 0:1, 0.27:1 and 0.2:1) were fed to a first polymerization reactor (R1). The R1 Al:Ti feed ratio and R2 Al:Ti feed ratio was optimized to 120:1 and 25:1 respectively. Ethylene conversion rates in each reactor were held constant, so that an increased catalyst feed to a particular reactor reflects a decrease in catalyst activity. In contrast to the comparative examples, other process parameters were now optimized. The optimal R2 B:Ti ratio was different for each run and increased as the R1 B:Ti ratio decreased. The optimal R2 B:Ti ratio was typically (at least) double the level used in the comparative examples 2-4. In inventive examples 6-9, the catalyst levels in R1 remained high; however, the catalyst levels in R2 dropped significantly, so that the overall catalyst use was comparable to or only slightly higher than that used in comparative example 1. A similar trend is observed when comparing inventive example 10 to comparative example 5. Comparable examples 2, 3 and 4 show higher total catalyst consumption than inventive examples 6, 7, 8 and 9. This is due to the fact that comparative examples 2, 3, and 4 do not add a superstoichiometric amount of ionic activator to R2, and hence do not benefit from a significant "reactivation" of the catalyst flowing from R1 to R2, as is the case for the inventive examples 6-9.

TABLE 3

|  | Examples | | | | |
|---|---|---|---|---|---|
|  | Invent. 6 | Invent. 7 | Invent. 8 | Invent. 9 | Invent. 10 |
| Octene/ethylene in fresh feed | 0.83 | 0.92 | 0.92 | 0.86 | 0.81 |
| Reactor 1 (R1) | | | | | |
| Mean Temperature (° C.) | 142.0 | 154.2 | 167.2 | 142.3 | 149.4 |
| Ethylene conversion | 84.06 | 83.85 | 83.68 | 84.09 | 78.24 |
| Hydrogen Feed (ppm) | 1.00 | 1.00 | 1.00 | 0.99 | 1.25 |
| Catalyst (ppm) to R1 | 0.42 | 0.60 | 0.83 | 0.37 | 0.258 |
| Al/Ti (mol/mol) | 120.0 | 120.0 | 120.0 | 120 | 120 |
| B/Ti (mol/mol) | 0.20 | 0.10 | 0.00 | 0.27 | 0.20 |
| Reactor 2 (R2) | | | | | |
| Mean Temperature (° C.) | 186.0 | 186.3 | 186.0 | 186.1 | 179.9 |
| Ethylene conversion | 87.00 | 86.91 | 86.97 | 87.06 | 82.98 |
| Hydrogen Feed (ppm) | 0.80 | 0.79 | 0.80 | 0.79 | 0.80 |
| Catalyst (ppm) to R2 | 0.15 | 0.19 | 0.20 | 0.15 | 0.085 |

TABLE 3-continued

| | Examples | | | | |
|---|---|---|---|---|---|
| | Invent. 6 | Invent. 7 | Invent. 8 | Invent. 9 | Invent. 10 |
| Al/Ti (mol/mol) | 25.0 | 25.0 | 25.0 | 25 | 25 |
| B/Ti (mol/mol) | 2.40 | 2.40 | 3.00 | 2.40 | 2.40 |
| Overall (R1 + R2) | | | | | |
| Total Catalyst (ppm) | 0.4 | 0.5 | 0.6 | 0.4 | 0.22 |
| Total B/Ti over R1 + R2 (mol/mol) | 0.98 | 0.90 | 0.94 | 1.06 | 1.03 |
| Polymer No. | PS-92091 | PS-92096 | PS-92101 | PS-93652 | PS-96911 |
| Density (g/cc) | 0.9142 | 0.9130 | 0.9135 | 0.9136 | 0.9153 |
| MI (melt index, $I_2$ in g/10 min) | 0.52 | 0.77 | 0.73 | 0.74 | 0.68 |
| S. Ex. | 1.27 | 1.28 | 1.29 | 1.28 | 1.23 |

In particular, the data in Table 3 shows that when a sufficiently large stoichiometric excess of ionic activator (e.g. B:Ti molar ratios of 2.4, or 3.0 in inventive examples 6-10) was fed to the second reactor, the catalyst activity loss in R1 associated with substoichiometric levels of ionic activator could be effectively reversed in R2.

This is readily apparent when comparing comp. example 4 with inventive example 8, in which no ionic activator is fed to the first reactor. In comp. example 4, the amount of catalyst fed to R1 and R2 is 1.07 ppm and 0.56 ppm respectively (the ratio of catalyst fed to each reactor, R1/R2 is 1.91). In inventive example 8, the amount of catalyst fed to R1 and R2 is 0.83 ppm and 0.2 ppm respectively (the ratio of catalyst fed to each reactor, R1/R2 is 4.15). Clearly then, when a sufficient stoichiometric excess of trityl borate was employed in R2, fresh catalyst feed to R2 could be reduced substantially. The advantages of reducing the fresh catalyst feed to R2 are at least twofold. First, reducing catalyst use has an immediate positive impact on process economics, since catalyst costs are reduced. Second, reducing catalyst use provides a polymer product with fewer metal residues present.

Finally, the overall B:Ti ratio feed over both reactors R1 and R2 was close to 1 in each inventive example (see Table 3). This is so, because the overall moles of ionic activator encountering the overall moles of catalyst, regardless of the ionic activator levels added to the R1, should be close to 1 or higher, in order to maximize overall catalyst activity before the polymer exits R2 and enters the devolatilization train. This helps to reduce metal residues in the polymer product. In the current invention, overall B:Ti ratios (for R1+R2) near 1 will be most cost effective, although higher overall B:Ti ratios (for R1+R2) may also be used, and are within the scope of the present invention.

It will be further recognized by persons skilled in the art, that the present process allows for the economical production of polymer having a given melt index (or molecular weight), under new process conditions which may enhance overall operability. For example, a polymer having a given melt index (or molecular weight) can, by using the process of the current invention, be made at higher temperatures and/or at higher hydrogen concentrations in the first reactor. Alternatively, the present invention allows for the economical production of a higher molecular weight polyethylene copolymer at a given temperature and hydrogen concentration in the first reactor.

Polymer and Film Properties

More extensive polymer data as well as film data for selected comparative and inventive examples are given below in Tables 4 and 5. The examples below provide more information on the polymer compositions obtained and in particular demonstrate that the inventive method leads to blown film having very good optical properties.

Polymers were extruded into monolayer films using a 2.5-inch blown film line. The extrudate was forced through a circular die having a four inch diameter and a 35 mil die gap. The frost line height was about 17 inches. Conventional additives (antioxidants and process aid) were added to all extrusions. The films in Table 5 were produced at 1 mil film thickness and a BUR (blow-up ratio) of 2.5.

ASTM procedure D1003 was used for the measurement of film haze. ASTM procedure D2457-03 was used for the measurement of film gloss at 45°. ASTM procedure D1709-01, Method A was used for the measurements of the dart impact strength using a phenolic dart head. ASTM 1922-03a procedure was used to measure the Elmendorf tear strengths of the films. ASTM D882 procedure was used to measure the modulus values of the films.

TABLE 4

| | Polymer Properties | | | | |
|---|---|---|---|---|---|
| Ex. No. & (Polymer No.) | Density | $I_2$ | S. Ex. | $I_{21}/I_2$ | Mw/Mn |
| Comp. No. 1 (PS-91124) | 0.9136 | 0.71 | 1.29 | 26.2 | 3.13 |
| Inv. No. 6 (PS-92091) | 0.9136 | 0.52 | 1.28 | 32 | 3.71 |
| Inv. No 9 (PS-93652) | 0.9136 | 0.74 | 1.28 | 25.2 | 4.17 |
| Comp. No. 5 (PS-96896) | 0.9155 | 0.68 | 1.24 | 26.2 | 3.13 |
| Inv. No. 10 (PS-96911) | 0.9153 | 0.68 | 1.23 | 24.4 | 2.83 |

TABLE 5

Film Properties

| Ex. No. & (Polymer No.) | Haze (%) | Gloss @ 45° | Dart Impact Strength (g/mil) | MD Tear Strength (g/mil) | TD Tear Strength (g/mil) | MD - 1% Secant Modulus (MPa) | TD - 1% Secant Modulus (MPa) |
|---|---|---|---|---|---|---|---|
| Comp. No. 1 (PS-91124) | 11.1 | 47.1 | 559 | 244 | 417 | 104 | 110 |
| Inv. No. 6 (PS-92091) | 7.9 | 60.6 | 518 | 353 | 457 | 110 | 127 |
| Inv. No 9 (PS-93652) | 8.4 | 57.9 | 506 | 257 | 433 | 104 | 120 |
| Comp. No. 5 (PS-96896) | 12.1 | 44 | 1125 | 238 | 376 | 122 | 142 |
| Inv. No. 10 (PS-96911) | 7.1 | 60 | 1044 | 220 | 405 | 139 | 161 |

With reference to Tables 4 and 5, it can be seen that polymers made using the inventive activation process (see Examples 6, 9 and 10) can be made into film with lower haze and higher gloss relative to film made from polymer not made with the inventive activation process (see Examples 1 and 5). Compare a haze of less than 9% for films made according to Examples 6, 9 and 10 against a haze of more than 10% for films made according to Examples 1 or 5; and compare a gloss at 45° of greater than 55 for films made according to Examples 6, 9 and 10 against a gloss at 45° of less than 50 for films made according to Examples 1 and 5.

The improvements in haze and gloss were obtained amongst polymers having distinct densities (Compare Examples 1, 6, and 9 which have densities of ca. 0.9136 g/cc; and Examples 5 and 10 which have densities of ca. 0.9155 and 0.9153 g/cc respectively).

What is claimed is:

1. A two stage polymerization process comprising:
in a first reactor, polymerizing ethylene and optionally an alpha olefin in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0;
feeding an effluent stream from the first reactor to a second reactor and in the second reactor polymerizing ethylene optionally with an alpha olefin in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the effluent stream fed from the first reactor;
further provided that the total molar ratio of ionic activator to organometallic catalyst present over both reactors is at least 0.8.

2. A solution polymerization process, wherein ethylene and optionally an alpha olefin are polymerized in a solvent in a first reactor in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0;
passing a polymer solution formed in the first reactor to a second reactor where ethylene and optionally an alpha olefin are polymerized in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the polymer solution passed from the first reactor;
further provided that the total molar ratio of ionic activator to organometallic catalyst present over both reactors is at least 0.8.

3. The polymerization process of claim 2 wherein the first reactor and the second reactor are stirred tank reactors.

4. The polymerization process of claim 2 wherein the total molar ratio of ionic activator to organometallic catalyst present over both reactors is at least 0.9.

5. The polymerization process of claim 2 wherein the total molar ratio ionic activator to organometallic catalyst present over both reactors is at least 1.0.

6. The polymerization process of claim 1 or 2 wherein the organometallic catalyst fed to the first reactor and the organometallic catalyst fed to the second reactor are the same catalyst.

7. The polymerization process of claim 1 or 2 wherein the organometallic catalyst is a phosphinimine catalyst.

8. The polymerization process of claim 1 or 2 wherein the ionic activator is trityl borate, $Ph_3CB(C_6F_5)_4$.

9. The polymerization process of claim 1 or 2 wherein the organometallic catalyst, the alkylaluminoxane and the ionic activator are un-supported.

10. The polymerization process of claim 2 wherein the molar ratio of ionic activator to organometallic catalyst fed to the first reactor is less than 0.75.

11. The polymerization process of claim 2 wherein the molar ratio of ionic activator to organometallic catalyst fed to the second reactor is at least 1.75.

12. The polymerization process of claim 2 wherein the molar ratio of Al from alkylaluminoxane to organometallic catalyst fed to the first and second reactor is from 10:1 to 250:1.

13. The polymerization process of claim 2 wherein the temperature in the first reactor is from 80° C. to 200° C. and the temperature in the second reactor is from 160° C. to 230° C.

14. The polymerization process of claim 2 wherein the second reactor is operated at a higher temperature than the first reactor.

15. The polymerization process of claim 1 or 2 wherein the organometallic catalyst has the formula, $(L)(PI)MX_2$, where M is Ti, Zr or Hf; PI is a phosphinimine ligand having the formula R¹₃P=N—, where R¹ is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

16. A solution polymerization process wherein ethylene and an alpha olefin are polymerized in a solvent in a first reactor at a temperature of from 80° C. to 200° C. in the presence of an organometallic catalyst and a cocatalyst, the cocatalyst comprising an alkylaluminoxane and an ionic activator, wherein the molar ratio of ionic activator to organometallic catalyst fed to the first reactor is less than 1.0;

passing a polymer solution formed in the first reactor to a second reactor where ethylene and an alpha olefin are polymerized at a temperature of from 160° C. to 230° C. in the presence of an organometallic catalyst and a cocatalyst, the cocatalyst comprising an alkylaluminoxane and an ionic activator, wherein the molar ratio of ionic activator to organometallic catalyst fed to the second reactor is at least 1.5, not including organometallic catalyst and ionic activator present in the polymer solution passed from the first reactor;

further provided that the total molar ratio of ionic activator to organometallic catalyst present over both reactors is at least 0.85.

17. The polymerization process of claim 16 wherein the alpha olefin is 1-octene.

18. The polymerization process of claim 16 wherein the organometallic catalyst is a phosphinimine catalyst.

19. The polymerization process of claim 16 wherein the ionic activator is trityl borate, $Ph_3CB(C_6F_5)_4$.

20. The polymerization process of claim 16 wherein the organometallic catalyst fed to the first reactor and the organometallic catalyst fed to the second reactor are the same catalyst.

* * * * *